US007486972B2

(12) United States Patent
Kouno

(10) Patent No.: US 7,486,972 B2
(45) Date of Patent: Feb. 3, 2009

(54) HANDS-FREE TELEPHONE APPARATUS

(75) Inventor: Yoshiyuki Kouno, Iwaki (JP)

(73) Assignee: Alpine Electronics, Inc. (JP)

( * ) Notice: Subject to any disclaimer, the term of this patent is extended or adjusted under 35 U.S.C. 154(b) by 525 days.

(21) Appl. No.: 11/393,376

(22) Filed: Mar. 30, 2006

(65) Prior Publication Data

US 2006/0223592 A1 Oct. 5, 2006

(30) Foreign Application Priority Data

Apr. 4, 2005 (JP) ............................ 2005-107135

(51) Int. Cl.
*H04M 1/00* (2006.01)
*H04M 9/00* (2006.01)

(52) U.S. Cl. .................................... 455/569.2; 379/419

(58) Field of Classification Search ................. 379/419, 379/420.01, 420.02, 420.03, 420.04; 455/569.1, 455/569.2
See application file for complete search history.

(56) References Cited

U.S. PATENT DOCUMENTS 6,934,538 B1 8/2005 Sakaguchi
7,096,047 B2 * 8/2006 Geren et al. ............. 455/569.1
7,117,021 B2 * 10/2006 Shearer et al. ........... 455/569.2

* cited by examiner

*Primary Examiner*—Curtis Kuntz
*Assistant Examiner*—Tuan D Nguyen
(74) *Attorney, Agent, or Firm*—Brinks Hofer Gilson & Lione

(57) ABSTRACT

A hands-free telephone apparatus which supports a user so as not to restrict the functions of the hands-free telephone processor. The hands-free telephone processor inquires the state of the mobile telephone when the model of the connected mobile telephone is unknown. If the hands-free telephone processor receives the notification of the state of the mobile telephone in response to this inquiry, the hands-free telephone processor refers to the warning information stored in advance. The hands-free telephone processor determines whether the mobile telephone is in a state of restricting the functions of the hands-free telephone apparatus available to the user. If it is necessary to output a warning, the hands-free telephone processor outputs the warning message registered corresponding to the state of the mobile telephone in the warning information. The hands-free telephone processor issues a restart command to the mobile telephone to restart the mobile telephone.

19 Claims, 6 Drawing Sheets

A MODEL INFORMATION

| MODEL | STATE SETTING COMMAND | STATE OBTAINING COMMAND | WARNING INFORMATION |
|---|---|---|---|
| P985 51r2 | DL: AT&#0<br>MM: AT&@0<br>..... | —— | —— |
| D980 01v01 | DL: AT&#1 | MM: AT&@1<br>CM: AT&%1<br>..... | [table] |
| ⋮ | ⋮ | ⋮ | ⋮ |
| UNKNOWN | —— | DL: AT&#2<br>MM: AT&@2<br>..... | [table] |

B WARNING INFORMATION

| MOBILE-TELEPHONE SETTING STATE | HANDS-FREE TELEPHONE PROCESSOR STATE | WARNING MESSAGE |
|---|---|---|
| DIAL LOCK: ON | —— | YOU CANNOT CONNECT TO INFORMATION CENTER WHEN TRYING TO CONNECT IN A STATE OF DIAL LOCK. TRANSMISSION AND RECEIVING ARE SOMETIMES NOT POSSIBLE. RELEASE LOCK AND MAKE A CONNECTION. |
| MANNER MODE: ON | —— | YOU MAY NOT HEAR INCOMING CALL SOUND FROM SPEAKER WHEN MANNER MODE IS SET. RELEASE MANNER MODE AND MAKE A CONNECTION. |
| MESSAGE MEMO: ON | AUTOMATIC RECEIVING: NO | AUTOMATIC RESPONSE MAY OCCUR AT RECEIVING TIME WHEN MESSAGE MEMO IS SET. RELEASE MESSAGE MEMO AND MAKE A CONNECTION WHEN CONNECTING TO APPARATUS IN A VEHICLE. |
| ANSWER PHONE SERVICE: ON | AUTOMATIC RECEIVING: NO | AUTOMATIC RESPONSE MAY OCCUR AT RECEIVING TIME WHEN ANSWER PHONE SERVICE IS SET. RELEASE ANSWER PHONE SERVICE AND MAKE A CONNECTION WHEN CONNECTING TO APPARATUS IN A VEHICLE. |
| AUTOMATIC RECEIVING: ON | AUTOMATIC RECEIVING: NO | AUTOMATIC RESPONSE MAY OCCUR AT RECEIVING TIME WHEN AUTOMATIC RECEIVING IS SET. RELEASE AUTOMATIC RECEIVING AND MAKE A CONNECTION WHEN CONNECTING TO APPARATUS IN A VEHICLE. |
| COMMUNICATION MODE: Packet COMMUNICATION | COMMUNICATION SETTING: LINE SWITCHING | YOU CANNOT CONNECT TO INFORMATION CENTER WHEN COMMUNICATION SETTING IS Packet COMMUNICATION. SET COMMUNICATION SETTING TO LINE SWITCHING AND MAKE A CONNECTION. |
| COMMUNICATION MODE: LINE SWITCHING | COMMUNICATION SETTING: Packet COMMUNICATION | YOU CANNOT CONNECT TO INFORMATION CENTER WHEN COMMUNICATION SETTING IS LINE SWITCHING. SET COMMUNICATION SETTING TO Packet COMMUNICATION AND MAKE A CONNECTION. |
| CONNECTING TO WEB | —— | TRANSMISSION AND RECEIVING ARE SOMETIMES NOT POSSIBLE WHEN BEING CONNECTED TO WEB. MAKE A CONNECTION IN A WAITING STATE. |
| UNKNOWN | —— | TRANSMISSION AND RECEIVING ARE SOMETIMES NOT POSSIBLE WHEN DIAL LOCK, MANNER MODE, ETC., ARE SET. RELEASE DIAL LOCK, MANNER MODE, MESSAGE MEMO, AND AUTOMATIC RECEIVING, AND MAKE A CONNECTION. |

FIG. 2

A MODEL INFORMATION

| MODEL | STATE SETTING COMMAND | STATE OBTAINING COMMAND | WARNING INFORMATION |
|---|---|---|---|
| P985 51r2 | DL: AT&#0; MM: AT&@0; ····· | ——— | ——— |
| D980 01v01 | DL: AT&#1 | MM: AT&@1; CM: AT&%1; ····· | |
| ⋮ | ⋮ | ⋮ | ⋮ |
| UNKNOWN | ——— | DL: AT&#2; MM: AT&@2; ····· | |

B WARNING INFORMATION

| MOBILE-TELEPHONE SETTING STATE | HANDS-FREE TELEPHONE PROCESSOR STATE | WARNING MESSAGE |
|---|---|---|
| DIAL LOCK: ON | ——— | YOU CANNOT CONNECT TO INFORMATION CENTER WHEN TRYING TO CONNECT IN A STATE OF DIAL LOCK. TRANSMISSION AND RECEIVING ARE SOMETIMES NOT POSSIBLE. RELEASE LOCK AND MAKE A CONNECTION. |
| MANNER MODE: ON | ——— | YOU MAY NOT HEAR INCOMING CALL SOUND FROM SPEAKER WHEN MANNER MODE IS SET. RELEASE MANNER MODE AND MAKE A CONNECTION. |
| MESSAGE MEMO: ON | AUTOMATIC RECEIVING: NO | AUTOMATIC RESPONSE MAY OCCUR AT RECEIVING TIME WHEN MESSAGE MEMO IS SET. RELEASE MESSAGE MEMO AND MAKE A CONNECTION WHEN CONNECTING TO APPARATUS IN A VEHICLE. |
| ANSWER PHONE SERVICE: ON | AUTOMATIC RECEIVING: NO | AUTOMATIC RESPONSE MAY OCCUR AT RECEIVING TIME WHEN ANSWER PHONE SERVICE IS SET. RELEASE ANSWER PHONE SERVICE AND MAKE A CONNECTION WHEN CONNECTING TO APPARATUS IN A VEHICLE. |
| AUTOMATIC RECEIVING: ON | AUTOMATIC RECEIVING: NO | AUTOMATIC RESPONSE MAY OCCUR AT RECEIVING TIME WHEN AUTOMATIC RECEIVING IS SET. RELEASE AUTOMATIC RECEIVING AND MAKE A CONNECTION WHEN CONNECTING TO APPARATUS IN A VEHICLE. |
| COMMUNICATION MODE: Packet COMMUNICATION | COMMUNICATION SETTING: LINE SWITCHING | YOU CANNOT CONNECT TO INFORMATION CENTER WHEN COMMUNICATION SETTING IS Packet COMMUNICATION. SET COMMUNICATION SETTING TO LINE SWITCHING AND MAKE A CONNECTION. |
| COMMUNICATION MODE: LINE SWITCHING | COMMUNICATION SETTING: Packet COMMUNICATION | YOU CANNOT CONNECT TO INFORMATION CENTER WHEN COMMUNICATION SETTING IS LINE SWITCHING. SET COMMUNICATION SETTING TO Packet COMMUNICATION AND MAKE A CONNECTION. |
| CONNECTING TO WEB | ——— | TRANSMISSION AND RECEIVING ARE SOMETIMES NOT POSSIBLE WHEN BEING CONNECTED TO WEB. MAKE A CONNECTION IN A WAITING STATE. |
| UNKNOWN | ——— | TRANSMISSION AND RECEIVING ARE SOMETIMES NOT POSSIBLE WHEN DIAL LOCK, MANNER MODE, ETC., ARE SET. RELEASE DIAL LOCK, MANNER MODE, MESSAGE MEMO, AND AUTOMATIC RECEIVING, AND MAKE A CONNECTION. |

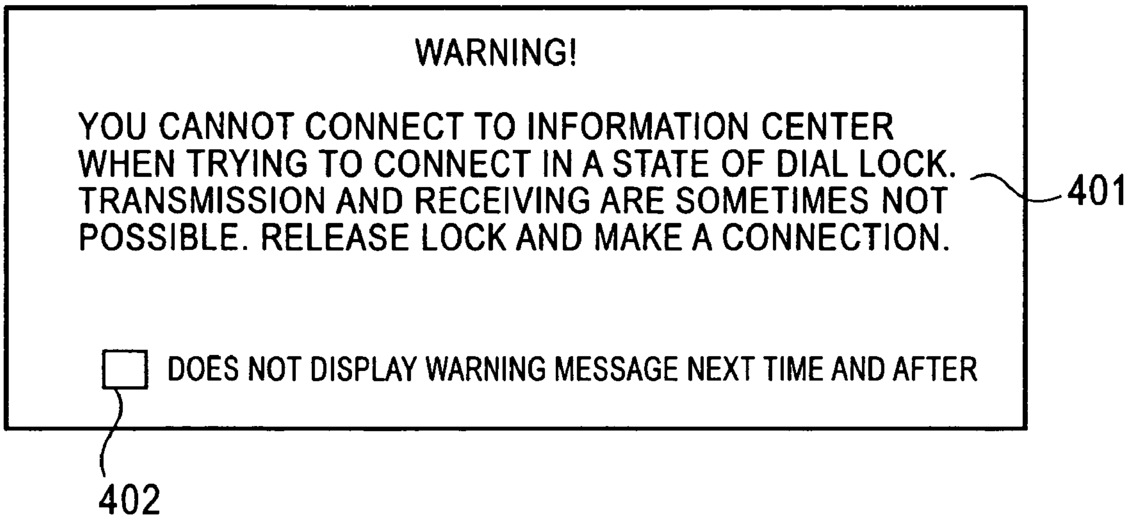

FIG. 4A

WARNING!

YOU CANNOT CONNECT TO INFORMATION CENTER
WHEN TRYING TO CONNECT IN A STATE OF DIAL LOCK.
TRANSMISSION AND RECEIVING ARE SOMETIMES NOT
POSSIBLE. RELEASE LOCK AND MAKE A CONNECTION. — 401

☐ DOES NOT DISPLAY WARNING MESSAGE NEXT TIME AND AFTER

402

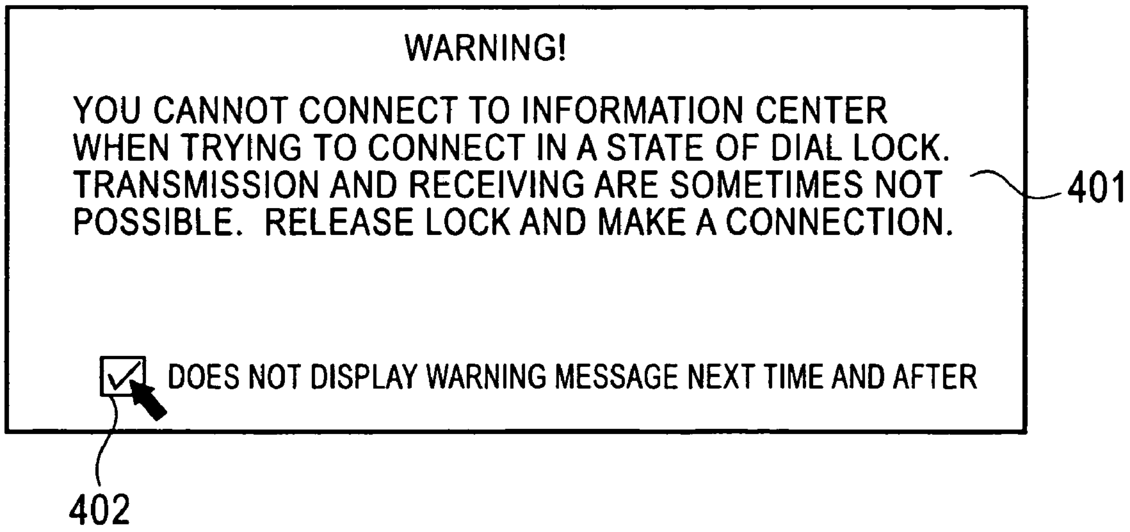

FIG. 4B

WARNING!

YOU CANNOT CONNECT TO INFORMATION CENTER
WHEN TRYING TO CONNECT IN A STATE OF DIAL LOCK.
TRANSMISSION AND RECEIVING ARE SOMETIMES NOT — 401
POSSIBLE.  RELEASE LOCK AND MAKE A CONNECTION.

☑ DOES NOT DISPLAY WARNING MESSAGE NEXT TIME AND AFTER

402

HANDS-FREE TELEPHONE APPARATUS

BACKGROUND

1. Field of the Invention

The present invention relates to a hands-free telephone apparatus for adding a hands-free telephone function to a telephone set.

2. Description of the Related Art

There is a telephone conversion style called "hands-free conversion" for a user using a telephone set.

A hands-free telephone conversion is a conversion using a telephone set with the aid of a microphone and a speaker, which are disposed outside of the telephone set, for inputting transmitting voice and outputting received voice, respectively. Here, an apparatus which is provided with a speaker for emitting received voice and a microphone for picking up voice to be transmitted from the telephone set in order to add the above-described hands-free telephone functions to a mobile phone (called a "cellular phone" as well) is called a hands-free telephone apparatus. The apparatus is mainly installed in a vehicle, and is used to enable a driving user to carry out hands-free telephone conversion using a mobile telephone (for example, Japanese Unexamined Patent Application Publication No. 2000-52886).

BRIEF SUMMARY

In a hands-free telephone apparatus for providing a hands-free telephone function to a connected telephone set, some function of the hands-free telephone apparatus, which is available to a user, is sometimes restricted depending on the state of the connected telephone set.

For example, in a hands-free telephone apparatus providing a hands-free telephone function to a mobile telephone, when a dial lock mode for invalidating a user's operation such as a dial-key operation, etc., of the connected mobile telephone is set, the mobile telephone also invalidates the operation from the hands-free telephone apparatus, and thus it sometimes becomes impossible to transmit and receive messages.

In such a case, the user is not allowed to know immediately why the functions of the hands-free telephone apparatus cannot be used, and thus the user cannot solve the problem.

Accordingly, it is an object of the present invention to support the user in using a hands-free telephone apparatus so that available functions of the hands-free telephone apparatus are not restricted depending on the state of the telephone set.

In order to achieve the above-described objects, there is provided a hands-free telephone apparatus for adding a hands-free telephone function to a connected telephone set, the apparatus including: a speaker for outputting voice received by the connected telephone set; a microphone for inputting voice to be transmitted from the connected telephone set; a state-information obtaining means for obtaining state information indicating a state of the telephone set from the connected telephone set when the telephone set is connected; and a warning means for warning a user to change the state of the telephone set when the state of the telephone set obtained by the state-information obtaining means restricts a function of the hands-free telephone apparatus available to the user.

According to such a hands-free telephone apparatus, when the state of the connected telephone is detected, if the detected state restricts the functions of the hands-free telephone apparatus, which are available to a user, a warning is given to the user to change the state of that telephone. Thus, it is possible to guide the user to change the state of the mobile telephone in order not to restrict the available functions of the hands-free telephone apparatus.

In this regard, the hands-free telephone apparatus may further include: model-information storage means for storing model information indicating a correlation between a model of the telephone set and a command for obtaining a state of the telephone set from the telephone set of the model for a plurality of models, wherein the state-information obtaining means obtains model-identification information indicating a model of the telephone set from the connected telephone set when the telephone set is connected, and issues a command corresponding to the model indicated by the model information of the model indicated by the obtained model-identification information stored in the model-information storage means to the connected telephone set in order to obtain state information indicating the state of the telephone set.

By this means, even if a command for obtaining the state of a telephone is different for each model of the telephone, it becomes possible to obtain the state of the telephone without any problem.

Also, in order to achieve the above-described objects, there is provided a hands-free telephone apparatus for adding a hands-free telephone function to a connected telephone set, the apparatus including: a speaker for outputting voice received by the connected telephone set; a microphone for inputting voice to be transmitted from the connected telephone set; model-information storage means for storing model information indicating a correlation between a model of a telephone set and a command for setting/changing a function of the hands-free telephone apparatus available to the user to a non-restricted state of the hands-free telephone apparatus function from the telephone set of the model for a plurality of models; model-identification information obtaining means for obtaining model-identification information indicating a model of the telephone set from the connected telephone set when the telephone set is connected; a telephone-set state setting section for issuing the command to the connected telephone set when the model-identification information storage section stores model information indicating a command corresponding to a model indicated by the model-identification information obtained by the model-identification information obtaining section.

a state-information obtaining section for obtaining state information indicating a state of the telephone set from the connected telephone set when the model-identification information storage section does not store model information indicating a command corresponding to a model indicated by the model-identification information obtained by the model-identification information obtaining section; and warning means for warning the user to change the state of the telephone set when the state of the telephone set obtained by the state-information obtaining means restricts a function of the hands-free telephone apparatus available to a user.

According to such a hands-free telephone apparatus, when it is possible to set/change the state of the connected telephone to a state which does not restrict the functions of the hands-free telephone apparatus available to the user, it is possible to automatically set/change the telephone to such a state in order not to restrict the functions of the hands-free telephone apparatus available to the user. Also, even when it is not possible to set/change the state of the connected telephone to a state which does not restrict the functions of the hands-free telephone apparatus available to the user, if the connected state restricts the functions of the hands-free telephone apparatus available to a user, a warning is given to the user to change the state of that telephone. Thus, it is possible to guide the user to change the state of the mobile telephone in order not to restrict the available functions of the hands-free telephone apparatus.

Here, more specifically, the state of the telephone set may be a state of whether there is a setting of a dial lock for invalidating the user's operation of dial keys or the like, and the warning means may warn the user to release the setting of the dial lock of the telephone set to the user when the state of the telephone set obtained by the state-information obtaining means is a state of being set to a dial lock.

Also, specifically, the state of the telephone set may be a state of whether there is a setting of a manner mode for informing the user of receiving a call without sounding an audible ringing at a call incoming time, and the warning means may warn the user to release the setting of the manner mode of the telephone set to the user when the state of the telephone set obtained by the state-information obtaining means is a state of being set to a manner mode.

Also, specifically, the state of the telephone set may be a state of whether the telephone set is using an Internet connection service, and the warning means may warn the user to terminate the use of the Internet connection service when the state of the telephone obtained by the state-information obtaining means is a state of using the Internet connection service.

Here, the warning section preferably gives a warning to the user when the state of the telephone obtained by the state-information obtaining means is a case of restricting a function of the hands-free telephone apparatus available to the user regardless of a state of the hands-free telephone apparatus, and, in addition, when the state of the telephone is a case of restricting a function of the hands-free telephone apparatus available to the user in a relationship with a state of the hands-free telephone apparatus. The functions of the hands-free telephone apparatus available to the user are sometimes restricted by not only the state of the telephone, but by the combination of the state of the telephone and the state of the hands-free telephone apparatus.

That is to say, more specifically, for example, the state of the telephone set may be a state of whether there is a setting of a message-memo mode for recording receiving voice by automatically responding at a call incoming time, and the warning means may warn the user to release the setting of the message-memo mode of the telephone set to the user when the state of the telephone obtained by the state-information obtaining means is a state of being set to a message-memo mode and when the hands-free telephone apparatus is not set to a mode of automatically responding at a call incoming time.

Also, specifically, the state of the telephone set may be a state of whether there is a setting of an answer-phone mode for using an answer-phone service provided by an answer-phone center on a telephone network at a call receiving time, and the warning means may warn the user to release the setting of the answer phone of the telephone set to the user when the state of the telephone obtained by the state-information obtaining means is a state of being set to a answer-phone mode and when the hands-free telephone apparatus is not set to a mode of automatically responding at a call receiving time.

Also, specifically, the state of the telephone set may be a state of whether there is a setting of an automatic receiving mode for automatically responding to an incoming call at a call receiving time, and the warning means may warn the user to release the setting of the automatic receiving mode of the telephone set to the user when the state of the telephone obtained by the state-information obtaining means is a state of being set to automatic receiving and when the hands-free telephone apparatus is not set to a mode of automatically responding at a call receiving time.

Also, specifically, the state of the telephone set may be a state of whether there is a setting of a packet communication mode for carrying out packet communication, and the warning means warns the user to set the telephone set to a line switching mode for carrying out line switching communication when the state of the telephone obtained by the state-information obtaining section is a state of being set to a packet communication mode and when the hands-free telephone apparatus is set to a mode of carrying out line switching communication.

Also, specifically, the state of the telephone set may be a state of whether there is a setting of line switching communication for performing line switching communication, and the warning means may warn the user to set the telephone set to a line switching mode for performing line switching communication when a mode of the warning section warns the user to set to the packet communication mode when the state of the telephone obtained by the state-information obtaining means is a state of being set to a packet communication mode.

Incidentally, the hands-free telephone apparatus further includes: warning-necessity setting means for setting a warning-necessity mode indicating necessity of the warning output in accordance with a user's operation, and when the warning-necessity mode indicates that the warning output is unnecessary, the warning section does not perform the warning.

Also, the telephone set may be a mobile telephone set connecting to a mobile telephone network, and the hands-free telephone apparatus may be mounted in a vehicle.

As described above, according to the present invention, it is possible to support the user in using the hands-free telephone apparatus so that the available functions of the hands-free telephone processor are not restricted depending on the state of the telephone.

BRIEF DESCRIPTION OF THE DRAWINGS

FIGS. 2A and 2B are diagrams illustrating one embodiment of the model information held by a hands-free telephone processor;

FIGS. 4A and 4B are diagrams illustrating examples of warning message displays of the hands-free telephone processor according to one embodiment of the disclosure.

DETAILED DESCRIPTION OF THE DRAWINGS

The present disclosure relates to a hands-free telephone apparatus which, in one embodiment, is installed in a vehicle and provides a hands-free telephone function to a mobile telephone (in general, called a "cellular phone" as well).

Figure 1:
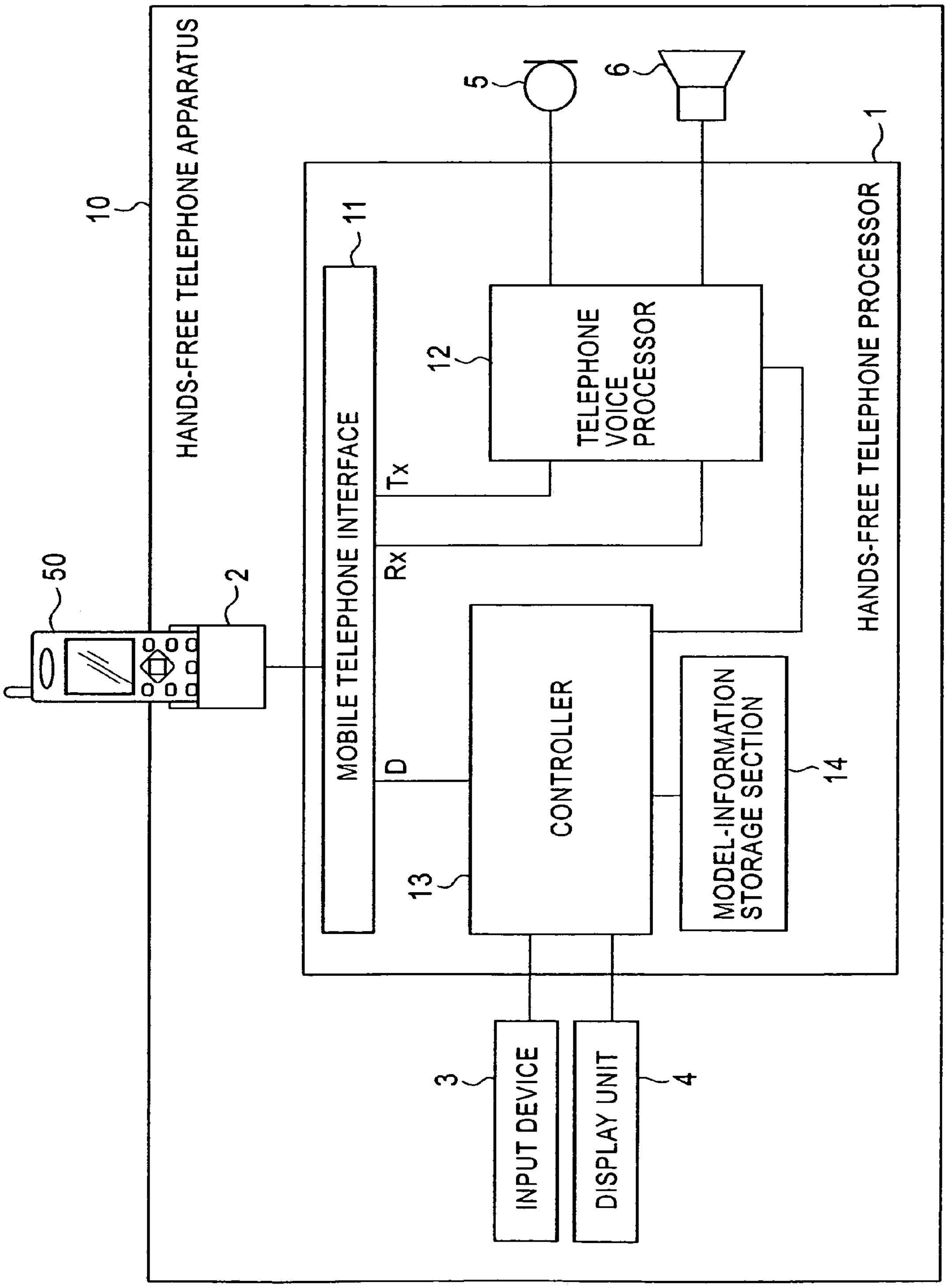
FIG. 1 is a diagram illustrating a configuration of one embodiment of a hands-free telephone apparatus.

FIG. 1 shows the configuration of one embodiment of a hands-free telephone apparatus. As shown in the figure, the hands-free telephone apparatus 10 generally comprises a hands-free telephone processor 1, a cradle 2 for holding a portable mobile phone 50, an input device 3, a display unit 4, a microphone 5, and a speaker 6. Also, the hands-free telephone processor 1 may comprise a mobile telephone interface 11, a telephone voice processor 12, a controller 13, and a model-information storage section 14.

Here, when the mobile phone 50 is attached to the cradle 2, a connector disposed on the cradle 2 and a connector disposed on the mobile phone 50 are coupled, and thus the mobile phone 50 and the mobile telephone interface 11 are connected. Various signals are input and output between the mobile phone 50 and the mobile telephone interface 11. However, in other embodiments, the mobile telephone interface 11 may connect to the mobile phone 50 by near-distance wireless communication, such as Bluetooth (a registered trademark) in order to input and output signals. In this case, the cradle 2 becomes unnecessary.

Here, the signals transmitted and received between the mobile telephone 50 and the mobile telephone interface 11 include a transmitting voice signal indicating voice transmitted from the mobile telephone 50 to the other party, a receiving signal indicating voice received by the mobile telephone 50 from the other party, and various commands and control data transmitted and received between the controller 13 and the mobile telephone 50 through the mobile telephone interface 11. In this regard, the transmitting voice signal is output from the hands-free telephone apparatus 1 to the mobile telephone 50, and the receiving voice signal is output from the mobile telephone 50 to the hands-free telephone apparatus 1.

While the mobile telephone 50 connected to the mobile telephone interface 11 of the hands-free telephone apparatus 10 is communicating with another telephone through a mobile telephone network, the mobile telephone 50 outputs voice signal received from the telephone of the other party to the mobile telephone interface 11 as the receiving voice signal. Next, the mobile telephone interface 11 sends the received receiving voice signal to the telephone voice processor 12. Also, the telephone voice processor 12 performs sound volume adjustment and loudness correction processing on the input receiving voice signal, and outputs the signal from the speaker 6.

On the other hand, while the mobile telephone 50 connected to the mobile telephone interface 11 of the hands-free telephone processor 1 is communicating with another telephone through a mobile telephone network, the voice signal input from the microphone 5 is subjected to echo cancellation processing by the telephone voice processor 12 for eliminating a voice component that has sneaked in the microphone 5 from the speaker 6, and then is sent to the mobile telephone 50 as a transmission voice signal through the mobile telephone interface 11. Then, the voice signal is transmitted from the mobile telephone 50 to the telephone of the other party.

The controller 13 issues a command to the mobile terminal 50 in accordance with a user's operation input from the input device 3 and information indicating various communication states such as an incoming call notification and a communication termination notification sent from the mobile telephone 50 in order to perform call control operation such as call operation and called response operation, etc., of the mobile telephone 50, and the other various communication operations. Also, the controller 13 performs processing to display information obtained from an information center to the display unit 4 by connecting to the information center through the mobile telephone 50 at a predetermined moment, processing to display a Web page to the display unit 4 by accessing the Web page specified by the user through the data communication using the mobile telephone 50 as a Web browser, processing to output ringing sound based on the voice data provided by the telephone voice processor 12 in advance to the speaker 6 when an incoming call is received from the mobile telephone 50, and the like.

FIG. 2 shows one embodiment of model information stored in the model-information storage section 14. As shown in the figure, the model information generally comprises a record provided for each model of the mobile telephone 50. Here, each row of the table in FIG. 2A corresponds to each of the records, respectively. Also, each record can retain a model of the mobile telephone 50, a state setting command registered for setting each state of the mobile telephone 50 of that model to a predetermined standard state, a state obtaining command registered for obtaining various state information of the mobile telephone 50 of that model, and warning information specifying a warning to be given to the user in accordance with the state of the various state information of the mobile telephone 50 and the state of the hands-free telephone apparatus 1. In this regard, the predetermined standard state of the mobile telephone 50 is defined as a state in which the functions of the hands-free telephone apparatus 1 are not restricted when the mobile telephone 50 is in that state.

Here, the mobile telephone 50 sometimes has a different command set for each model, and a command provided for a certain model or an equivalent command to that command is sometimes not provided for another model. That is to say, there are some models which allow setting/changing each state of the mobile telephone 50 using a command, and there are some other models which do not allow setting/changing each state of the mobile telephone 50 using a command. Also, similarly, there are some models which allow obtaining information indicating each state of the mobile telephone 50 using a command, and there are some other models which do not allow obtaining information indicating each state of the mobile telephone 50 using a command.

Each record of model information typically stores a command as a state-setting command if the corresponding model allows setting/changing each state of the mobile telephone 50 using that command. However, if the corresponding model does not allow to set/change each state of the mobile telephone 50 using a command, the command is not stored as the state-setting command. Also, in the same manner, each record of model information typically stores a command as a state-obtaining command if the corresponding model allows obtaining each state of the mobile telephone 50 using that command. However, if the corresponding model does not allow to obtain each state of the mobile telephone 50 using a command, that command is not stored as the state-obtaining command.

In this model information, when a command for setting the mobile telephone 50 to a certain state is stored as a state-setting command in a record, if there is a command for obtaining the state, that command may not be stored as the state-obtaining command.

As shown in FIG. 2A, the model information comprises a record whose model cannot be identified, that is to say, a record for an unknown model. The record corresponding to this unknown model stores "unknown" as a model, and a command normally used in a plurality of models is stored as a state-obtaining command in order to obtain information indicating each state of the mobile telephone 50.

Here, in this embodiment, a description will be given of states in which a function of the hands-free telephone apparatus 10 available to a user is sometimes restricted depending on whether the state exists, or depending on the combination of whether the state exists and the state of the hands-free telephone processor 1 as a state of the mobile telephone 50 to be processed. That is to say, specifically, the following states of the mobile telephone 50 are described.

In one embodiment, a first state is a state of whether there is a setting of a dial lock which invalidates the user's operations of dial keys, etc. A second state is a state of whether there is a setting of a manner mode which informs the user of an incoming call by vibration, etc., in place of sounding an audible ringing at a call incoming time. A third state is a state of whether there is a setting of a message memo (corresponding to an answer phone) which automatically responds to an incoming call and records the voice received from the other party when a user does not perform a response operation (off-hook operation) within a certain period of time at a call incoming time. A fourth state is a state of whether there is a setting of an answer phone service in which an answer phone telephone center automatically responds to an incoming call in place of the mobile telephone 50 and records the voice received from the other party when a user does not perform a response operation (off-hook operation) within a certain period of time at a call incoming time. A fifth state is a state of whether there is a setting of automatic receiving which automatically responds to an incoming call without waiting a user's response operation at a call incoming time. A sixth state is a state of whether there is a setting of a packet communication mode in which the mobile telephone 50 performs packet communication (data communication). A seventh state is a state of whether there is a setting of a line switching mode in which the mobile telephone 50 performs communication (usual voice communication) by line switching. An eighth state is a state of whether there is a state of connecting to the Web indicating whether the mobile telephone 50 is connecting to the Internet using an Internet connection service provided from a telephone network in order to enable the mobile telephone 50 to browse a Web page using a Web browser on the mobile telephone 50. In this regard, the relationships between each of the above states of the mobile telephone 50 or the combination of the above states of the mobile telephone 50 and the state of the hands-free telephone processor 1, and the restrictions of the functions of the hands-free telephone apparatus 10 are shown in the description of warning messages of the warning information in FIG. 2B below.

The commands for inquiring the above first to eighth states are stored as the state-obtaining commands of the record of the model information. In this regard, for example, in the record of the second model D98001V01 in FIG. 2A, the command AT&@1 represents a command for inquiring the state MM of whether a manner mode is set for the mobile telephone of the model D98001V01, and the command AT&%1 represents a command for inquiring the state CM of whether a message memo is set for the mobile telephone of the model D98001V01.

Also, as the state-setting commands for of the record of the model information, the record stores a command for setting the mobile telephone 50 to a state in which a dial lock is not set, a command for setting the mobile telephone 50 to a state in which a manner mode is not set, a command for setting the mobile telephone 50 to a state in which an answer phone service is not set, and a command for setting the mobile telephone 50 to a state in which automatic receiving is not set. That is to say, for example, in the record of the first model P98551r2 in FIG. 2A, the command AT� represents a command for releasing the setting of the dial lock DL for the mobile telephone of the model P98551r2, and the command AT&@0 represents a command for releasing the setting of the manner mode MM for the mobile telephone of the model P98551r2.

As shown in FIG. 2B, as the warning information of the record of each model in FIG. 2A and the record of the model "unknown", the record stores warning messages to be presented to the user depending on the above-described states of the mobile telephone 50, or the combination of the states of the mobile telephone 50 and the hands-free telephone processor 1.

Here, in this embodiment, a description will be given of the case where a function of the hands-free telephone apparatus 10 available to a user is sometimes restricted depending on whether that state exists and the combination of the state of the mobile telephone 50 and the state of the hands-free telephone processor 1. That is to say, specifically, for example, the state of the hands-free telephone processor 1 includes a state of whether there is a setting of automatic receiving which automatically responds to an incoming call without waiting for a user's response operation at call incoming time, a state of whether there is a setting of a packet communication mode in which the mobile telephone 50 performs packet communication (data communication), and a state of whether there is a setting of a line switching mode in which the mobile telephone 50 performs communication (usual voice communication) by line switching.

For the state in which a dial lock is set in the mobile telephone 50, a warning message stating that the hands-free telephone processor 1 is sometimes prohibited from connecting to an information center such that transmission and receiving is not possible is stored. Also, for the state in which a manner mode is set in the mobile telephone 50, a warning message stating that an incoming call sound is sometimes not output from the speaker if the manner mode is set is stored. Also, for the combination of the state in which a message memo is set in the mobile telephone 50 and the state in which automatic receiving is not set in the hands-free telephone processor 1, a warning message stating that an automatic response may occur at a call incoming time if a message memo is set is stored. Also, for the combination of the state in which an answer phone service is set in the mobile telephone 50 and the state in which automatic receiving is not set in the hands-free telephone processor 1, a warning message stating that an automatic response may occur at call incoming time if an answer phone service is set is stored. Also, for the combination of the state in which automatic receiving is set in the mobile telephone 50 and the state in which automatic receiving is not set in the hands-free telephone processor 1, a warning message stating that an automatic response may occur at a call incoming time if automatic receiving is set in the mobile telephone 50 is stored. Also, for the combination of the state in which a packet communication mode is set in the mobile telephone 50 and the state in which line switching is set in the hands-free telephone processor 1, a warning message stating that a connection to the information center becomes prohibited if a packet mode is set in the mobile telephone 50 is stored. Also, for the combination of the state in which a line switching mode is set in the mobile telephone 50 and the state in which a line switching mode is set in the hands-free telephone processor 1, a warning message stating that a connection to the information center sometimes becomes prohibited if a line switching mode is set in the mobile telephone 50 is stored. Also, for the state in which the mobile telephone 50 is connecting to the Web, a warning message stating that transmission and receiving become prohibited if the mobile telephone 50 is connected to the Web is stored.

Here, this warning information also stores a warning message corresponding to an unknown state of the mobile telephone 50. In this field, a warning message stating that transmission and receiving become prohibited if a dial lock, a manner mode, a message memo, an answer phone service, and automatic receiving are set in the mobile telephone 50 is stored corresponding to the unknown state of the mobile telephone 50.

In an embodiment comprising such a configuration, the controller 13 of the hands-free telephone processor 1 performs the warning processing at a mobile-telephone connection time as shown below.

Figure 3:
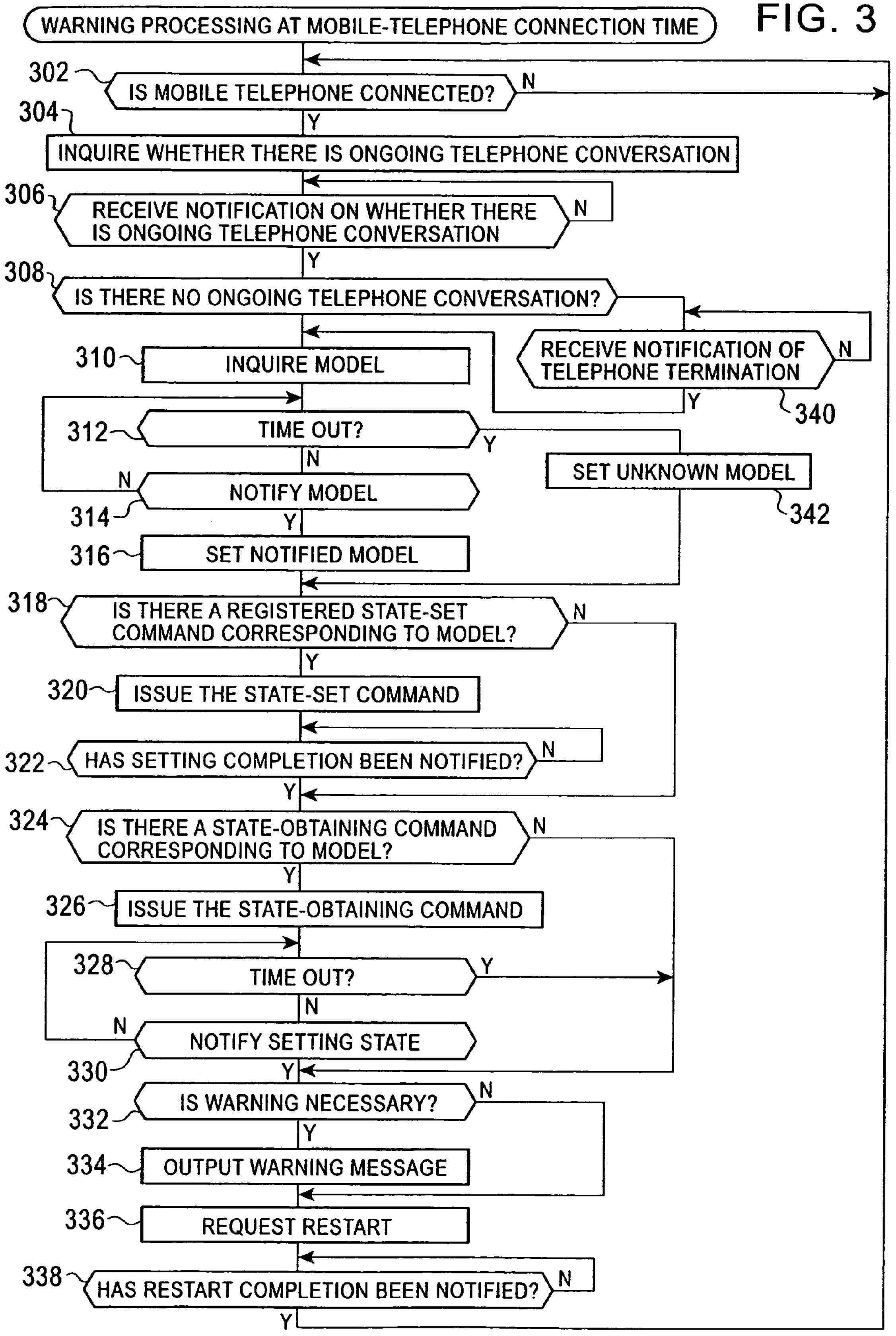
FIG. 3 is a flowchart illustrating one embodiment of a method for warning processing at mobile-telephone connection time by a hands-free telephone processor.

FIG. 3 shows one embodiment of a method for warning processing at a mobile-telephone connection time performed by the controller 13. As shown in the figure, in this processing, when the mobile telephone 50 is connected to the mobile telephone interface 11 (step 302), the controller 13 issues a command for inquiring whether the mobile telephone 50 is currently in conversation through the mobile telephone interface 11 (step 304). The controller 13 waits for a response to the inquiry from the mobile telephone 50 (step 306). If a response of no ongoing conversation is received from the mobile telephone 50 (step 308), the processing proceeds to step 310. On the other hand, if a response of ongoing conversation is received from the mobile telephone 50, the controller 13 waits for the receiving of the notification of conversion termination from the mobile telephone 50. That is to say, the controller 13 waits for the conversion termination of the mobile telephone 50 (step 340), and then processing proceeds to step 310.

In step 310, the controller 13 issues a command for inquiring the model of the mobile telephone 50 from the mobile telephone 50 through the mobile telephone interface 11. Here, the controller 13 uses a generally-used command for inquiring the model of the mobile telephone 50. If the controller 13 has received (step 314) the notification of the model of that mobile telephone 50 from the mobile telephone 50 in a certain period of time (step 312), the controller 13 sets the model notified as the model of the mobile telephone 50 (step 316), and proceeds to step 318. On the other hand, if the controller 13 has failed to receive the notification of the model of that mobile telephone 50 from the mobile telephone 50 in a certain period of time (step 312), the controller 13 sets the model of the mobile telephone 50 as an unknown model (step 342), and the processing proceeds to step 318.

Next, in step 318, the controller 13 checks whether a command is registered as a state-setting command in the record of the model set in step 316 or step 340 in the model information stored in the model-information storage section 14. If not registered, the processing proceeds to step 324. On the other hand, if a command is registered as a state-setting command, the controller 13 issues the command registered as the state-setting command in the record to the mobile telephone 50 through the mobile telephone interface 11 (step 320). The controller 13 waits (step 322) for receiving the setting-completion notification indicating the completion of the setting of the state indicated by the command in the mobile telephone 50 as the response to each of the issued commands from the mobile telephone 50, and then the processing proceeds to step 324. In this regard, if a plurality of commands is registered as state-setting commands, the controller 13 sequentially issues a command in step 320 and confirms the receiving of the notification of the setting completion in step 322 for each of the registered commands. If the processing for all the commands is completed, the processing proceeds to step 324.

In step 324, the controller 13 checks whether a state-obtaining command is registered in the record of the model, which has been set in step 316 or step 340, of the model information stored in the model-information storage section 14. If not registered, the processing proceeds to step 332. On the other hand, if a command is registered as a state-obtaining command, the controller 13 issues the command registered as a state-obtaining command in the record to the mobile telephone 50 through the mobile telephone interface 11 (step 326). If the controller 13 receives (step 330) the notification of the state that having been inquired by the command as a response to each command issued in a certain period in time (step 328), the processing proceeds to step 332. On the other hand, if the controller 13 cannot receive the notification of the state having been inquired by the command as a response to each command issued in a certain period in time (step 328), the inquired state is set to unknown, and the processing proceeds to step 332. In this regard, if a plurality of commands are registered as state-obtaining commands, the controller 13 sequentially issues a command in step 326 and the receiving of the notification of the state in step 330 or the setting of unknown for the inquired state corresponding to the occurrence of the time out in step 328 for each of the registered commands. If the processing for all the commands is completed, the processing proceeds to step 332.

In step 332, the controller 13 checks whether a warning message corresponding to the current state of the mobile telephone 50 obtained from the state-setting command issued in step 318 and the state of the mobile telephone 50 received in step 330, or the combination of the current state of the mobile telephone 50 and the current state of the hands-free telephone processor 1 is registered in the warning information of the record of the model set in step 316 or step 340 (step 332). If not registered, the processing proceeds to step 336.

On the other hand, if such a warning message is registered in the warning information, the registered warning message is displayed to the display unit 4 (step 334), and the processing proceeds to step 336. In this regard, if at least one of the setting states of the dial lock, the manner mode, the message memo, the answer phone service, and the automatic receiving of the mobile telephone 50 is unknown, the warning message corresponding to the unknown state of the mobile telephone 50 stored in the warning message of the record is displayed. Also, if the state of whether the mobile telephone 50 is connected to the Web is unknown, it is assumed to be connected to the Web, and the warning message registered corresponding to the state of being connected to the Web in the warning information of the record is displayed. Also, when the state of the mobile telephone 50 is unknown as to the state of line switching mode or packet communication mode, if the hands-free telephone processor 1 is in the line switching mode, the mobile telephone 50 is assumed to the set to the packet communication mode. If the hands-free telephone processor 1 is in the packet communication mode, the mobile telephone 50 is assumed to be set to the line switching mode. Then, the warning message registered in the warning information of the record is displayed.

In step 336, the controller 13 issues the restart command to the mobile telephone 50 through the mobile telephone interface 11. If the completion of the restart is notified (step 338) from the mobile telephone 50, the processing returns to step 302, and the controller 13 waits for the next connection of the mobile telephone 50. In this regard, the restart of the mobile telephone 50 in step 336 is performed in order to reliably set the operation state of the mobile telephone 50 to a waiting state for the incoming call.

In the above, a description has been given of warning processing performed by the controller 13 at a mobile-telephone connection time.

Incidentally, the display output of a warning message to the display unit 4 carried out by step 334 of the above warning processing at a mobile-telephone connection time may be performed in one embodiment as shown in FIG. 4A. That is to say, in step 334, a check box button 402 for asking whether a warning message is displayed subsequently together with the display of the warning message 401 registered in the warning information may be displayed. Also, as shown in FIG. 4B, if the user checks this check button 401, the controller 13 may not subsequently display the warning message to the display unit 4 at all. Alternatively, the controller 13 may not subsequently display only the warning message displayed when the check button 401 is checked to the display unit 4.

Figure 5A:
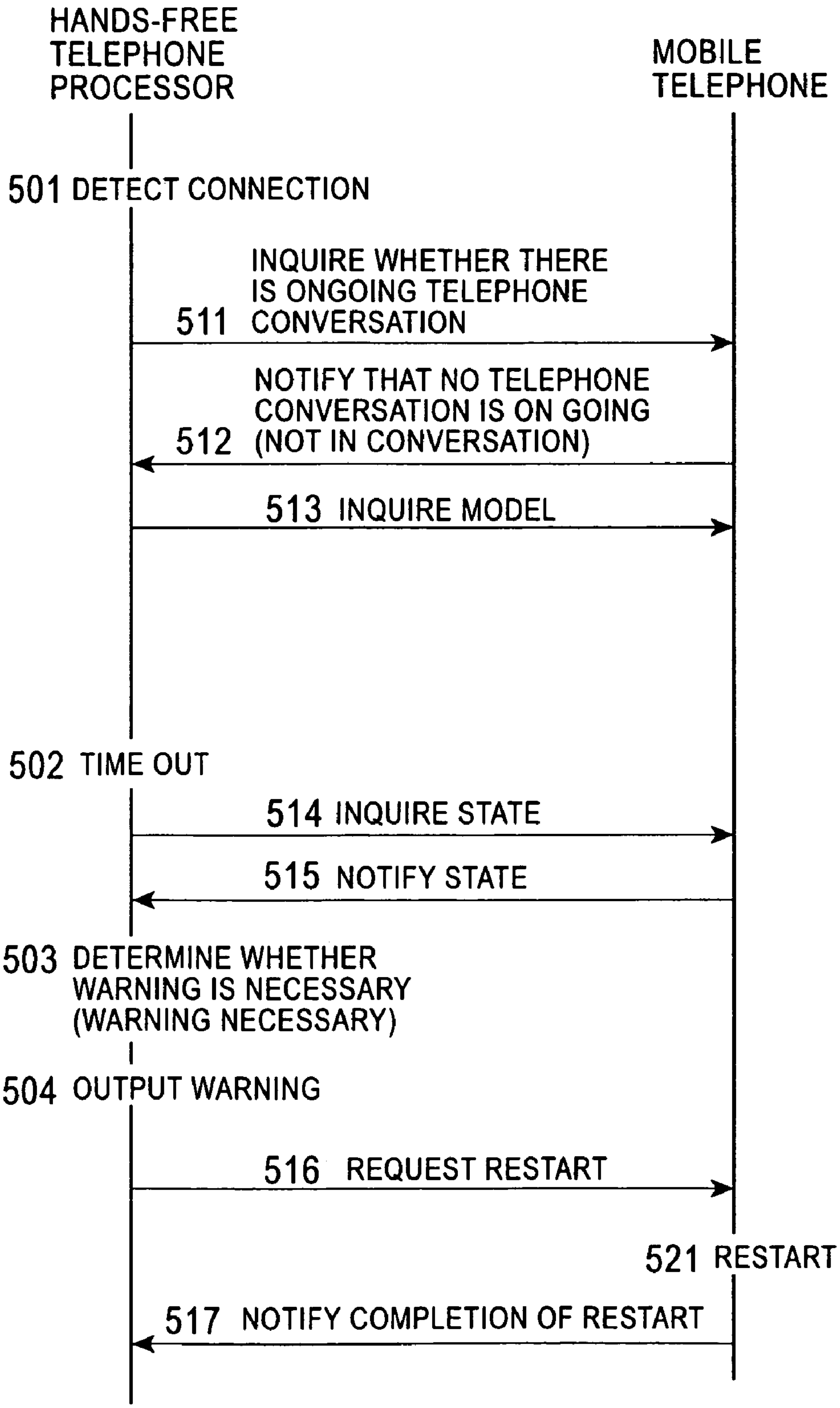
FIGS. 5A and 5B are diagrams illustrating examples of the operation sequence of the warning processing at mobile-telephone connection time by a hands-free telephone processor according to one embodiment of the disclosure.
Figure 5B:
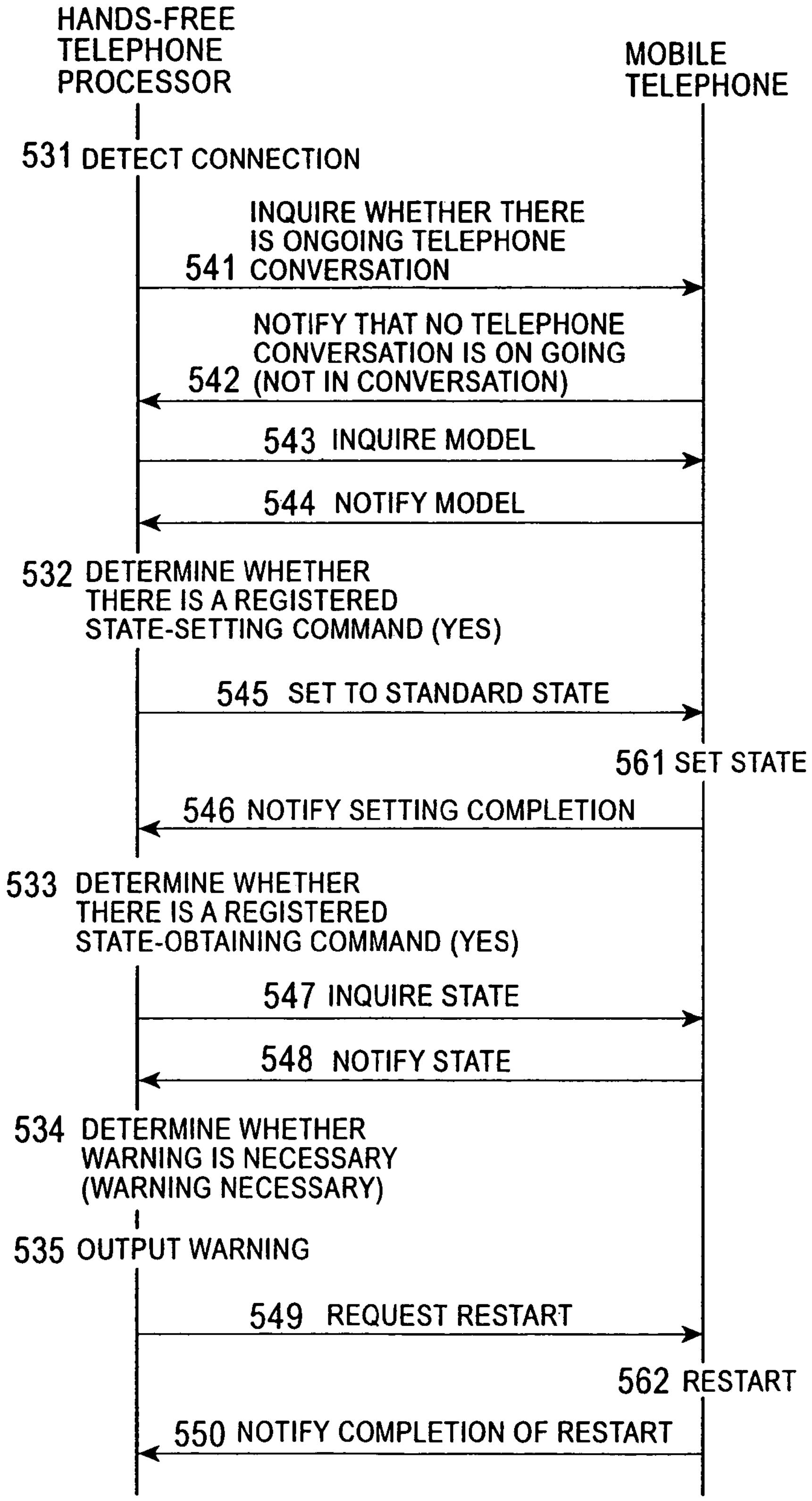

Here, examples of the operation of the warning processing at the above mobile-telephone connection time are displayed in FIGS. 5A and 5B.

FIG. 5A shows an example of one embodiment of the operation sequence of the hands-free telephone processor 1 and the mobile telephone 50 in the case where the mobile telephone 50 connected to the hands-free telephone processor 1 is provided with a function of notifying a state in response to a command from the outside and is not provided with a function of notifying a model in response to a command from the outside and a function of setting/changing a state by a command from the outside.

As shown in the figure, in this case, when the hands-free telephone processor 1 detects a connection with the mobile telephone 50 (501), the hands-free telephone processor 1 issues a command for inquiring of the mobile telephone 50 whether a telephone conversion is currently going on (511). If the hands-free telephone processor 1 receives the notification of no conversation as the response to the inquiry from the mobile telephone 50 (512), the hands-free telephone processor 1 issues a command for inquiring a model of the mobile telephone 50 to the mobile telephone 50 (513).

Here, in this case, the mobile telephone 50 is not provided with the function of notifying the model, and thus no response is made to the command inquiring the model. Accordingly, time out occurs in the hands-free telephone processor 1 (502). When time out occurs, the hands-free telephone processor 1 issues a command registered as a state-obtaining command in the record corresponding to unknown model of the model information stored in the model-information storage section 14 to the mobile telephone 50 to inquire the state of the mobile telephone 50 (514). When the hands-free telephone processor 1 receives the notification of the state of the mobile telephone 50 from the mobile telephone 50 in response to this inquiry (515), the hands-free telephone processor 1 refers to the warning information of the record corresponding to an unknown model of the model information, and determines whether the state of the mobile telephone 50 (or the combination of the state of the mobile telephone 50 and the state of the hands-free telephone processor 1) needs to output a warning (503). If it is necessary to output a warning, the hands-free telephone processor 1 displays the warning message registered in response to the state of the mobile telephone 50 (or the combination of the state of the mobile telephone 50 and the state of the hands-free telephone processor 1) notified in the warning information of the record corresponding to the unknown model of the model information (504). The hands-free telephone processor 1 issues a restart command to the mobile telephone 50 (516), restarts the mobile telephone 50 (521), and receives the notification of the restart completion from the mobile telephone 50 (517).

Next, FIG. 5B shows examples of the operation sequences of the hands-free telephone processor 1 and the mobile telephone 50 in the cases where the mobile telephone 50 connected to the hands-free telephone processor 1 is provided with the function of notifying a model in response to the command from the outside, the function of setting/changing the state by the command from the outside, and the function of notifying the state in response to the command from the outside.

As shown in the figure, in this case, when the hands-free telephone processor 1 detects a connection with the mobile telephone 50 (531), the hands-free telephone processor 1 issues a command inquiring whether the mobile telephone 50 is currently communicating (541). When the hands-free telephone processor 1 receives notification of not during communication as a response to the inquiry from the mobile telephone 50, the hands-free telephone processor 1 issues a command inquiring the model of the mobile telephone 50 to the mobile telephone 50 (543). When the model is notified to the hands-free telephone processor 1 from the mobile telephone 50 as a response to the command inquiring the model (544), the hands-free telephone processor 1 checks whether a state-setting command is registered in the record of the model notified from the mobile telephone 50 in the model information stored in the model-information storage section 14 (532). If the command is registered, the hands-free telephone processor 1 issues the registered command to the mobile telephone 50 to set the state that can be set/changed to the standard state by the command outside of the mobile telephone 50 (545).

The state setting in accordance with the received command is performed in the mobile telephone 50 (561). The mobile telephone 50 transmits a setting completion notification (546) indicating the completion of the setting of the state specified by the command to the hands-free telephone processor 1. When the hands-free telephone processor 1 receives the setting completion notification (546), the hands-free telephone processor 1 checks whether a state-obtaining command is registered in the record of the model notified from the mobile telephone 50 in the model information stored in the model-information storage section 14 (533). If the command is registered, the hands-free telephone processor 1 issues the registered command to the mobile telephone 50 in order to inquire the state of the mobile telephone 50 (547). When the hands-free telephone processor 1 receives the notification of the state of the mobile telephone 50 from the mobile telephone 50 in response to this inquiry (548), the hands-free telephone processor 1 refers to the warning information of the record corresponding to the model notified from the mobile telephone 50, and determines whether the state of the mobile telephone 50 (or the combination of the state of the mobile telephone 50 and the state of the hands-free telephone processor 1) is a state necessary to output a warning (534). If it is necessary to output a warning, the hands-free telephone processor 1 outputs the warning message which is registered in the warning information of the record notified from the mobile telephone 50 correspondingly to the state of the connected mobile telephone 50 (or the combination of the state of the mobile telephone 50 and the state of the hands-free telephone processor 1) (535). The hands-free telephone processor 1 issues a restart command to the mobile telephone 50 (549) to restart the mobile telephone 50 (562), and receives the notification of the restart completion from the mobile telephone 50 (550).

In this regard, in the case where the mobile telephone 50 connected to the hands-free telephone processor 1 is provided with the function of notifying the model in response to the command from the outside and the function of notifying the state in response to the command from the outside, and is not provided with the function of setting/changing the state by the command from the outside, the operation sequence of the hands-free telephone processor 1 and the mobile telephone 50 becomes the sequence that is obtained by eliminating the operations (545), (546), and (561) of setting the state of the mobile telephone 50 to the standard state from the operation sequence in FIG. 5B.

Above, embodiments of a hands-free telephone apparatus installed in a vehicle and providing hands-free telephone function to a mobile telephone is disclosed. It will be appreciated that each of the disclosed embodiments can be similarly applied to a hands-free telephone apparatus 10 that is not installed in a vehicle. Further, a telephone to which the hands-free telephone apparatus 10 gives a hands-free function may be a telephone other than a mobile telephone 50, such as a fixed-line telephone.

Additionally, it will be appreciated that in embodiments when the state of the connected telephone is detected, if the detected state restricts the functions of the hands-free telephone apparatus 10, which are available to a user, a warning is given to the user to change the state of that telephone. Thus, it is possible to guide the user to change the state of the mobile telephone 50 in order not to restrict the available functions of the hands-free telephone apparatus 10.

It is therefore intended that the foregoing detailed description be regarded as illustrative rather than limiting, and that it be understood that it is the following claims, including all equivalents, that are intended to define the spirit and scope of this disclosure.

The invention claimed is:

1. A hands-free telephone apparatus for adding a hands-free telephone function to a connected telephone set, the apparatus comprising: a speaker for outputting voice received by the connected telephone set; a microphone for inputting voice to be transmitted from the connected telephone set; a state-information obtaining section for obtaining state information indicating a state of the telephone set from the connected telephone set when the telephone set is connected; a model-information storage section for storing model information indicating a correlation between a model of the telephone set and a command for obtaining a state of the telephone set from the telephone set of the model for a plurality of models, wherein the state-information obtaining section obtains model-identification information indicating a model of the telephone set from the connected telephone set when the telephone set is connected, and issues a command corresponding to the model indicated by the model information of the model indicated by the obtained model-identification information stored in the model-information storage section to the connected telephone set in order to obtain state information indicating the state of the telephone set and a warning section for warning a user to change the state of the telephone set when the state of the telephone set obtained by the state-information obtaining section restricts a function of the hands-free telephone apparatus available to the user.

2. The hands-free telephone apparatus of claim 1, further comprising:

a warning-necessity setting section for setting a warning-necessity mode indicating necessity of outputting the warning in accordance with the user's operation, wherein, when the warning-necessity mode indicates that the warning output is unnecessary, the warning section does not give the warning.

3. The hands-free telephone apparatus of claim 1, wherein the telephone set is a mobile telephone set connecting to a mobile telephone network, and the hands-free telephone apparatus is mounted in a vehicle.

4. The hands-free telephone apparatus of claim 1, wherein the state of the telephone set is a state of whether there is a setting of a dial lock for invalidating the user's operation of dial keys or the like, and the warning section warns the user to release the setting of the dial lock of the telephone set to the user when the state of the telephone set obtained by the state-information obtaining section is a state of being set to a dial lock.

5. The hands-free telephone apparatus of claim 1, wherein the state of the telephone set is a state of whether there is a setting of a manner mode for informing the user of receiving a call without sounding an audible ringing at a call incoming time, and the warning section warns the user to release the setting of the manner mode of the telephone set to the user when the state of the telephone set obtained by the state-information obtaining section is a state of being set to a manner mode.

6. The hands-free telephone apparatus of claim 1, wherein the state of the telephone set is a state of whether the telephone set is using an Internet connection service, and the warning section warns the user to terminate the use of the Internet connection service when the state of the telephone obtained by the state-information obtaining section is a state of using the Internet connection service.

7. The hands-free telephone apparatus of claim 1, wherein the warning section gives a warning to the user when the state of the telephone obtained by the state-information obtaining section is a state of restricting a function of the hands-free telephone apparatus available to the user regardless of a state of the hands-free telephone apparatus.

8. The hands-free telephone apparatus of claim 7, wherein the state of the telephone set is a state of whether there is a setting of a message-memo mode for recording received voice by automatically responding at a call incoming time, and the warning section warns the user to release the setting of the message-memo mode of the telephone set to the user when the state of the telephone obtained by the state-information obtaining section is a state of being set to a message-memo mode and when the hands-free telephone apparatus is not set to a mode of automatically responding at a call incoming time.

9. The hands-free telephone apparatus of claim 7, wherein the state of the telephone set is a state of whether there is a setting of an answer-phone mode for using an answer-phone service provided by an answer-phone center on a telephone network at a call receiving time, and the warning section warns the user to release the setting of the answer phone of the telephone set to the user when the state of the telephone obtained by the state-information obtaining section is a state of being set to a answer-phone mode and when the hands-free telephone apparatus is not set to a mode of automatically responding at a call receiving time.

10. The hands-free telephone apparatus of claim 7, wherein the state of the telephone set is a state of whether there is a setting of an automatic receiving mode for automatically responding to an incoming call at a call incoming time, and the warning section warns the user to release the setting of the automatic receiving mode of the telephone set to the user when the state of the telephone obtained by the state-information obtaining section is a state of being set to an automatic receiving and when the hands-free telephone apparatus is not set to a mode of automatically responding at a call receiving time.

11. The hands-free telephone apparatus of claim 7, wherein the state of the telephone set is a state of whether there is a setting of a packet communication mode for carrying out packet communication, and the warning section warns the user to set the telephone set to a line switching mode for carrying out line switching communication when the state of the telephone obtained by the state-information obtaining section is a state of being set to a packet communication mode and when the hands-free telephone apparatus is set to a mode of carrying out line switching communication.

12. The hands-free telephone apparatus of claim 7, wherein the state of the telephone set is a state of whether there is a setting of line switching communication for carrying out line switching communication, and the warning section warns the user to set the telephone set to a packet communication mode for carrying out packet communication when the state of the telephone obtained by the state-information obtaining section is a state of being set to a line switching communication mode and when the hands-free telephone apparatus is set to a mode of carrying out packet communication.

13. The hands-free telephone apparatus according to claim 12, wherein the telephone set is a mobile telephone set connecting to a mobile telephone network, and the hands-free telephone apparatus is mounted in a vehicle.

14. A hands-free telephone apparatus for adding a hands-free telephone function to a connected telephone set, the apparatus comprising:

a speaker for outputting voice received by the connected telephone set;

a microphone for inputting voice to be transmitted from the connected telephone set;

a model-information storage section for storing model information indicating a correlation between a model of a telephone set and a command for setting/changing a function of the hands-free telephone apparatus available to the user to a non-restricted state of the hands-free telephone apparatus function from the telephone set of the model for a plurality of models;

a model-identification information obtaining section for obtaining model-identification information indicating a model of the telephone set from the connected telephone set when the telephone set is connected;

a telephone-set state setting section for issuing the command to the connected telephone set when the model-identification information storage section stores model information indicating a command corresponding to a model indicated by the model-identification information obtained by the model-identification information obtaining section;

a state-information obtaining section for obtaining state information indicating a state of the telephone set from the connected telephone set when the model-identification information storage section does not store model information indicating a command corresponding to a model indicated by the model-identification information obtained by the model-identification information obtaining section; and a warning section for warning the user to change the state of the telephone set when the state of the telephone set obtained by the state-information obtaining section restricts a function of the hands-free telephone apparatus available to a user.

15. The hands-free telephone apparatus according to claim 14, wherein the warning section gives a warning to the user when the state of the telephone obtained by the state-information obtaining section is a state of restricting a function of the hands-free telephone apparatus available to the user regardless of a state of the hands-free telephone apparatus.

16. The hands-free telephone apparatus according to claim 14, further comprising:

a warning-necessity setting section for setting a warning-necessity mode indicating necessity of outputting the warning in accordance with the user's operation, wherein, when the warning-necessity mode indicates that the warning output is unnecessary, the warning section does not give the warning.

17. The hands-free telephone apparatus according to claim 14, wherein the telephone set is a mobile telephone set connecting to a mobile telephone network, and the hands-free telephone apparatus is mounted in a vehicle.

18. A method of supporting use of a hands-free telephone apparatus, the hands-free telephone apparatus comprising a speaker for outputting voice received by a connected mobile telephone set and a microphone for inputting voice transmitted from the connected mobile telephone, the method comprising the steps of: obtaining model-identification information indicating a model of the telephone set from the connected telephone set when the telephone set is connected to the hands-free telephone apparatus; issuing a command to the connected telephone set when the hands-free telephone apparatus already knows the command for setting/changing a function of the hands-free telephone apparatus available to the user to a non-restricted state; obtaining state information indicating a state of the telephone set from the connected telephone set when the hands-free telephone apparatus does not know the command for setting/changing a function of the hands-free telephone apparatus available to the user to a non-restricted state; and giving a warning to change the state of the telephone set to the user when the obtained state of the telephone set restricts a function of the hands-free telephone apparatus available to the user.

19. The method of claim 18, wherein the telephone set is connecting to a mobile telephone network, and the hands-free telephone apparatus is mounted in a vehicle.

* * * * *

UNITED STATES PATENT AND TRADEMARK OFFICE

CERTIFICATE OF CORRECTION

PATENT NO. : 7,486,972 B2
APPLICATION NO. : 11/393376
DATED : February 3, 2009
INVENTOR(S) : Yoshiyuki Kouno It is certified that error appears in the above-identified patent and that said Letters Patent is hereby corrected as shown below:

Column 16, claim 19, line 53, after “telephone set is” delete “connecting” and substitute --connected-- in its place.

Signed and Sealed this

Twenty-eighth Day of July, 2009

JOHN DOLL
*Acting Director of the United States Patent and Trademark Office*